US012668016B2

(12) United States Patent
Shimada et al.

(10) Patent No.: US 12,668,016 B2
(45) Date of Patent: Jun. 30, 2026

(54) EXPANSION MOLDED BODY AND METHOD FOR PRODUCING MOLDED BODY

(71) Applicant: KYORAKU CO., LTD., Kyoto (JP)

(72) Inventors: Kengo Shimada, Yamato (JP);
Yoshihiro Yamasaki, Yamato (JP);
Yoshinori Ono, Yamato (JP); Tadatoshi Tanji, Yamato (JP)

(73) Assignee: KYORAKU CO., LTD., Kyoto (JP)

( * ) Notice: Subject to any disclaimer, the term of this patent is extended or adjusted under 35 U.S.C. 154(b) by 477 days.

(21) Appl. No.: 17/786,848

(22) PCT Filed: Dec. 21, 2020

(86) PCT No.: PCT/JP2020/047699
§ 371 (c)(1),
(2) Date: Jun. 17, 2022

(87) PCT Pub. No.: WO2021/132164
PCT Pub. Date: Jul. 1, 2021

(65) Prior Publication Data
US 2023/0040996 A1     Feb. 9, 2023

(30) Foreign Application Priority Data

Dec. 26, 2019    (JP) ................................. 2019-236917
Dec. 26, 2019    (JP) ................................. 2019-237561

(51) Int. Cl.
B29C 49/42      (2006.01)
B29C 49/50      (2006.01)
B29K 105/00     (2006.01)

(52) U.S. Cl.
CPC .. B29C 49/42826 (2022.05); B29C 49/42394 (2022.05); B29C 49/50 (2013.01);
(Continued)

(58) Field of Classification Search
None
See application file for complete search history.

(56) References Cited

U.S. PATENT DOCUMENTS 9,234,088 B2 *    1/2016   Mayama ................... C08K 3/32
2004/0171708 A1 *  9/2004   Yoshizawa ......... C08K 5/34926
521/56
(Continued)

FOREIGN PATENT DOCUMENTS

CN          107793635 A        3/2018
CN          110128741 A   *    8/2019   ............ C08J 9/0023
(Continued)

OTHER PUBLICATIONS

Polyolefins, 2024, Plastics Europe, pp. 1-4 (Year: 2024).*
(Continued)

*Primary Examiner* — Thomas J Kessler
(74) *Attorney, Agent, or Firm* — Maier & Maier, PLLC

(57) ABSTRACT

A foam the molded body with excellent flame retardancy. A foam molded body formed of a foam-molded resin composition containing a base resin and a flame retardant. An expansion ratio of the foam molded body is 1.1 to 9.0 times, the base resin contains polyolefin, and a blending amount of the flame retardant in the resin composition is 0.1 to 10% by mass.

2 Claims, 16 Drawing Sheets

(52) U.S. Cl.
CPC ................ *B29K 2105/0026* (2013.01); *B29K 2995/0016* (2013.01)

(56) References Cited

U.S. PATENT DOCUMENTS

| | | | | |
|---|---|---|---|---|
| 2010/0279087 A1 | 11/2010 | Tokiwa et al. | | |
| 2011/0127688 A1* | 6/2011 | Onodera | ................ | C08J 9/0061 |
| | | | | 264/54 |
| 2011/0250384 A1* | 10/2011 | Sumi | ......................... | B32B 3/28 |
| | | | | 156/228 |
| 2012/0060960 A1* | 3/2012 | Sumi | ..................... | B29C 51/261 |
| | | | | 156/77 |
| 2012/0135173 A1* | 5/2012 | Tsuchida | ................. | B29C 49/22 |
| | | | | 428/36.5 |
| 2013/0224415 A1* | 8/2013 | Onodera | ................. | B29C 44/04 |
| | | | | 428/36.5 |
| 2015/0133571 A1 | 5/2015 | Claessen et al. | | |
| 2016/0333159 A1 | 11/2016 | Onodera et al. | | |
| 2017/0313839 A1* | 11/2017 | Guo | ........................ | C08J 9/0076 |
| 2017/0341285 A1* | 11/2017 | Onodera | ................. | B29C 49/04 |
| 2018/0057651 A1* | 3/2018 | Lin | ......................... | C08J 9/0023 |
| 2021/0178653 A1 | 6/2021 | Shimada et al. | | |
| 2021/0363318 A1 | 11/2021 | Onodera et al. | | |

FOREIGN PATENT DOCUMENTS

| | | | | | |
|---|---|---|---|---|---|
| CN | 110229372 A | * | 9/2019 | .......... | C08J 9/00223 |
| CN | 110256765 A | * | 9/2019 | ............... | C08J 5/18 |
| EP | 3290467 A1 | | 3/2018 | | |
| JP | H0718108 A | * | 1/1995 | | |
| JP | 2004116959 A | | 4/2004 | | |
| JP | 2004122691 A | | 4/2004 | | |
| JP | 2005068843 A | * | 3/2005 | ............ | B32B 27/00 |
| JP | 2015-124380 A | | 7/2015 | | |
| JP | 2016-83859 A | | 5/2016 | | |
| JP | 201858352 A | | 4/2018 | | |
| WO | 2009128440 A2 | | 10/2009 | | |
| WO | 2019088115 A1 | | 5/2019 | | |

OTHER PUBLICATIONS

Extended European Search Report issued on Dec. 23, 2022, in corresponding European Application No. 20907624.9, 8 pages.
Office Action issued on Oct. 24, 2023, in corresponding Japanese Application No. 2019-236917, 7 pages.
Office Action issued on Dec. 12, 2023, in corresponding Chinese Application No. 202080085075.8, 15 pages.
International Search Report mailed on Mar. 23, 2021, in corresponding to International Application No. PCT/JP2020/047699; 5 pages (with English Translation).
Office Action issued on Nov. 14, 2024, in corresponding European Application No. 20 907 624.9, 6 pages.

* cited by examiner

EXPANSION MOLDED BODY AND METHOD FOR PRODUCING MOLDED BODY

TECHNICAL FIELD (First Viewpoint)

The present invention relates to a foam molded body.

(Second Viewpoint)

The present invention relates to a manufacturing method of a molded body and particularly to a manufacturing method of a molded body in which a burr is removed in a mold.

BACKGROUND (First Viewpoint)

A duct is installed in a dashboard and on a ceiling of an automobile to ventilate air from air conditioning equipment. A foam molded body is sometimes used for such a duct in consideration of heat insulation and quietness (Patent Literature 1).

(Second Viewpoint)

As a molded product obtained by molding a resin material, for example, various air conditioning ducts installed in an instrument panel of an automobile are known. These air conditioning ducts can be easily manufactured by blow-molding a parison extruded from a die of an extruder.

In the molded product (duct) obtained by blow molding, a burr is formed around a clamped mold, and it is an essential step to remove it. In general, the burr removal after blow molding is performed by using a press machine. By punching the burr using a mold corresponding to an outer shape of the molded product, the burr around the mold is collectively removed.

For example, Patent Literature 2 discloses a blow molding method and a blow molding device for performing blow molding in a mold and describes improving the cooling efficiency of the burr by actively bringing the burr into contact with the mold. In blow molding, the burr is punched by a press machine after waiting until the burr has been cooled sufficiently, which leads to a large time loss and a loss of productivity. According to the technology described in Patent Document 2, the time required for the series of steps from blow molding to burr removal is short, and productivity can be improved.

PATENT LITERATURE

Patent Literature 1: JP-A-2015-124380
Patent Literature 2: JP-A-2016-83859

SUMMARY (First Viewpoint)

Flame retardancy may be required for a foam molded body, and in order to increase flame retardancy, a flame retardant may be blended into a resin composition that constitutes the foam molded body. However, depending on the blending amount of the flame retardant, flame retardancy may not be sufficiently exhibited.

The present invention has been made in view of such circumstances and provides a foam molded body having excellent flame retardancy.

(Second Viewpoint)

Not only in blow molding but also in other molding where a burr is formed around a molded body, the basic idea is that burr removal is performed by the press machine or manually after the molded body is removed from the mold. For example, the same applies to the invention described in Patent Literature 2. However, when the burr is removed by the press machine, if the size of the molded product is large, the size of the press machine needs to be increased corresponding to this, which requires a large capital investment. Further, if the size or shape of the molded products differs, the size or shape of the form of the press machine needs to be changed, which further increases the capital investment.

Under such a circumstance, particularly in the molding of a large-sized molded product, the burr formed around the molded product is manually removed in a current situation. Specifically, a molded body, which is a product, with a burr is removed from a mold, and a processing with a knife and the like is manually performed. In the method of manually removing the burr from a large molded product one by one, burr removal is performed after removal from the mold, which requires a large number of man-hours, and the time required for the burr removal per molded product is long, resulting in a significant loss of productivity.

The present invention has been proposed in view of such conventional circumstances, and an object is to provide a manufacturing method of a molded body by which a burr can be efficiently removed without a large-scale device.

(First Viewpoint)

According to the present invention, provided is a foam molded body formed of a foam-molded resin composition containing a base resin and a flame retardant, wherein an expansion ratio of the foam molded body is 1.1 to 9.0 times, the base resin contains polyolefin, and a blending amount of the flame retardant in the resin composition is 0.1 to 10% by mass.

The present inventor found that a foam molded body with excellent flame retardancy can be obtained by setting the content of the flame retardant within a specific range for a foam molded body having a specific expansion ratio and containing a specific base resin and has completed the present invention.

Hereinafter, various embodiments of the present invention will be exemplified. The embodiments described below can be combined with each other.

Preferably, the expansion ratio is 3.0 to 6.0 times.

Preferably, the foam molded body is hollow or sheet-shaped.

Preferably, an average cell diameter of the foam molded body in a thickness direction is 100 to 1000 μm.

Preferably, a foaming agent used for the foam molded body contains carbon dioxide gas.

(Second Viewpoint)

To achieve the above-described object, the manufacturing method of a molded body of the present invention is a manufacturing method of a molded body by bringing split molds into contact with each other to mold the molded body comprising a portion to be an opening and by separating a burr formed around the molded body from the molded body, wherein, after molding the molded body, the burr is separated from the molded body by causing a protruding member to protrude from one of the split molds to the burr formed around the molded body, in the split molds in contact with each other, a concave portion is provided on each of the split molds so that a space for accommodating the burr is formed outside a pinch portion of each of the split molds, the pinch portion being configured to pinch an outer peripheral portion of the molded body, and on the one of the split molds from which the protruding member protrudes, a depth of the concave portion at a position corresponding to the opening of the molded body is larger than a depth of the concave portion in a deburring region in which the protruding member is provided.

The basic idea of the present invention is to perform burr removal in a mold and realizes efficient burr removal while suppressing a decrease in the molding cycle by separating the burr by the protruding member.

Here, in the present invention, a molded body having a portion to be an opening is molded, and it is also an object to solve a peculiar problem associated with such molding. Specifically, when the burr is separated from the molded body by causing the protruding member to protrude from one of the split molds, it is preferable to form the concave portion for forming the space for accommodating the burr as shallow as possible on the one of the split molds from which the protruding member protrudes. By forming the shallow concave portion, the distance between the tip of the protruding member and the parting line of the molded body for cutting the burr is reduced, and the burr can be cut more easily. When the depth of the concave portion becomes large, the force of the protruding member is not effectively transmitted to the burr.

However, when the depth of the concave portion is small, the volume of the space (burr escape space) for accommodating the burr become smaller. Consequently, the molten resin cannot be completely accommodated in the burr escape space, and a thick-walled portion (so-called excess thickness portion) tends to be formed on the molded body. The formation of the thick-walled portion may lead to lower dimensional accuracy and may cause a big problem in the opening of the molded body. The decreased dimensional accuracy becomes an obstacle, for example, when fitting the opening of a duct-shaped molded body to another member.

Therefore, in the present invention, the depth of the concave portion at the position of the opening is larger than the depth of the concave portion of the other portion on the one of the split molds from which the protruding member protrudes, and the protruding member is provided in the other portion, to solve these problems.

The depth of the concave portion at the position corresponding to the opening of the molded body is set larger than the depth of the concave portion of the other portion, and the volume of the space (burr escape space) for accommodating the burr is increased, so that the formation of the thick-walled portion is suppressed, and dimensional accuracy is ensured. On the other hand, the depth of the concave portion of the other portion is set smaller, and the protruding member is provided in this portion, so that the distance between the tip of the protruding member and the burr (parting line) is reduced, and the burr can be cut smoothly.

According to the present invention, the burr can be efficiently removed without a large-scale device. In particular, according to the present invention, when the molded body is removed after molding, the burr treatment is completed, and thus the efficiency of the molding step can be greatly improved. Further, even when the molded body has an opening, the burr can be efficiently cut and removed while suppressing the generation of an excess thickness portion and ensuring the dimensional accuracy of the opening.

DETAILED DESCRIPTION (First Viewpoint)

Hereinafter, embodiments of the present invention will be described. Various characteristics in the embodiments described below can be combined with each other. Further, the invention is independently established for each characteristic.

1. Foam Molded Body 101

Figure 1:
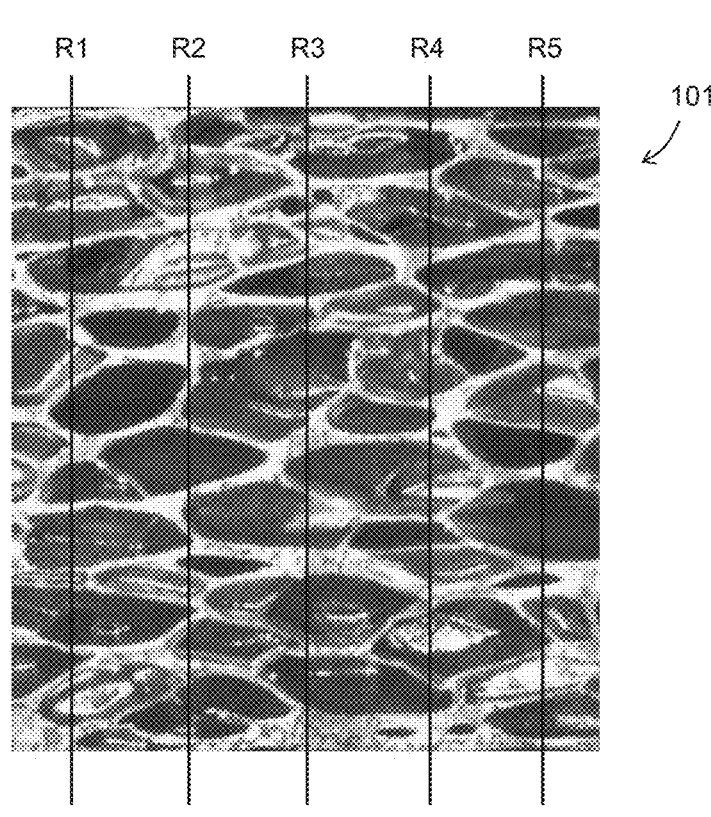
FIG. 1 shows an example of a cross-sectional photograph of a foam molded body 101.

As shown in FIG. 1, a foam molded body 101 of one embodiment of the present invention is formed of a foam-molded resin composition containing a base resin and a flame retardant.

<Base Resin>

The base resin contains polyolefin. Examples of the polyolefin include polyester, polypropylene, ethylene-propylene copolymer and a mixture thereof. The base resin may be composed of only polyolefin or may contain other thermoplastic resin. Examples of other thermoplastic resin include a polyamide resin and a polyester resin. The content of the polyolefin in the base resin is, for example, 50 to 100% by mass, specifically, for example, 50, 60, 70, 80, 90, 99, 100% by mass and may be within the range between any two of the numerical values exemplified herein.

<Flame Retardant>

The flame retardant is composed of any compound that enhances the flame retardancy of the base resin. Examples of the flame retardant include a phosphorus-based flame retardant, a halogen-based flame retardant, and a hindered amine-based flame retardant. The hindered amine-based flame retardant is particularly preferable from the viewpoint of improving the flame retardancy of the polyolefin.

The blending amount of the flame retardant in the resin composition is 0.1 to 10% by mass. This is because if the blending amount is too small, the effect of improving the flame retardancy may be insufficient, and if the blending amount is too large, the moldability may be deteriorated. This blending amount is specifically, for example, 0.1, 0.5, 1, 1.5, 2, 3, 4, 5, 6, 7, 8, 9, 10% by mass and may be within the range between any two of the numerical values exemplified herein.

<Foam Molded Body 101>

Examples of the foam molded body 101 include a foam blow molded body formed by foam blow molding and a foam sheet molded body formed by foam sheet molding. Examples of the foam blow molded body include a foam duct used in automobiles and the like. Examples of the foam sheet molded body include automobile interior members (e.g., door trim).

The expansion ratio of the foam molded body 101 is 1.1 to 9.0 times, preferably 3.0 to 6.0 times. If the expansion ratio is too small, the insulating property and the lightness may be insufficient, and if the expansion ratio is too large, the rigidity may be insufficient. The expansion ratio is specifically, for example, 1.1, 1.5, 2.0, 2.5, 3.0, 3.5, 4.0, 4.5, 5.0, 5.5, 6.0, 7.0, 8.0, 9.0 times, and may be within the range between any two of the numerical values exemplified herein. The expansion ratio is the value obtained by the equation of [density of resin composition before foaming/density (bulk density) of resin composition after foaming].

The foam molded body 101 is preferably hollow or sheet-shaped. In such a case, the foam molded body 101 burns easily, and thus there is a particular technical significance of imparting flame retardancy.

The thickness of the wall forming the foam molded body 101 is, for example, 1.0 to 6.0 mm. If the wall thickness is too small, the rigidity of the foam molded body 101 may be insufficient, and if the wall thickness is too large, the weight of the foam molded body 101 may be excessive. This wall thickness is preferably 2.0 mm or more, and more preferably 3.0 mm or more. This is because the larger the wall thickness, the better the flame retardancy of the foam molded body 101. This wall thickness is, specifically, for example, 1.0, 1.5, 2.0, 2.5, 3.0, 3.5, 4.0, 4.5, 5.0, 5.5, 6.0 mm, and may be within the range between any two of the numerical values exemplified herein.

The foam molded body 101 preferably has an average cell diameter of 100 to 1000 μm in the thickness direction. If the average cell diameter is too small, the insulating property and the lightness may be insufficient, and if the average cell diameter is too large, the rigidity may be insufficient. This average cell diameter is preferably 200 μm or more, and more preferably 400 μm or more. This is because the larger the average cell diameter, the more remarkable the effect of improving the flame retardancy due to the addition of the flame retardant. This average cell diameter is specifically, for example, 100, 200, 300, 400, 500, 600, 700, 800, 900, 1000 μm and may be within the range between any two of the numerical values exemplified herein.

The average cell diameter is measured by the following method.

First, a cross-sectional photograph is taken at the magnification of 50 times, as shown in FIG. 1.

Next, five reference lines R1 to R5 extending in the thickness direction are drawn in the cross-sectional photograph. The interval between the reference lines is set to 500 μm.

For each reference line, the number of cells that the reference line passes through is counted.

For each cell, the maximum length in the thickness direction (the length at the part where the length in the thickness direction is the longest) is measured.

The tentative average cell diameter is calculated for each reference line according to Equation 1. Further, the average cell diameter is calculated by arithmetically averaging the tentative average cell diameters calculated for the reference lines.

$$\text{Tentative average cell diameter} = \text{Total of maximum lengths of all counted cells/Number of counted cells} \quad \text{(Equation 1)}$$

Examples of the foaming agent used for foaming the resin composition forming the foam molded body 101 include a physical foaming agent, a chemical foaming agent, and a mixture thereof, and a physical foaming agent is preferable. As the physical foaming agent, inorganic physical foaming agents, such as air, carbon dioxide gas, nitrogen gas, and water, organic physical foaming agents, such as butane, pentane, hexane, dichloromethane, and dichloroethane, and their supercritical fluids can be used. Examples of the chemical foaming agent include those that generate carbon dioxide gas by a chemical reaction between acid (e.g., citric acid or salt thereof) and base (e.g., sodium bicarbonate). The foaming agent preferably contains carbon dioxide gas. This is because, in such a case, the average cell diameter becomes large, and the effect of improving the flame retardancy by the flame retardant tends to be high.

2. Manufacturing Method of Foam Molded Body 101

Here, the manufacturing method of the foam molded body 101 is described, taking a foam blow molded body and a foam sheet molded body as examples.

2-1. Foam Blow Molded Body 2-1-1. Configuration of Molding Machine 110

Figure 2:
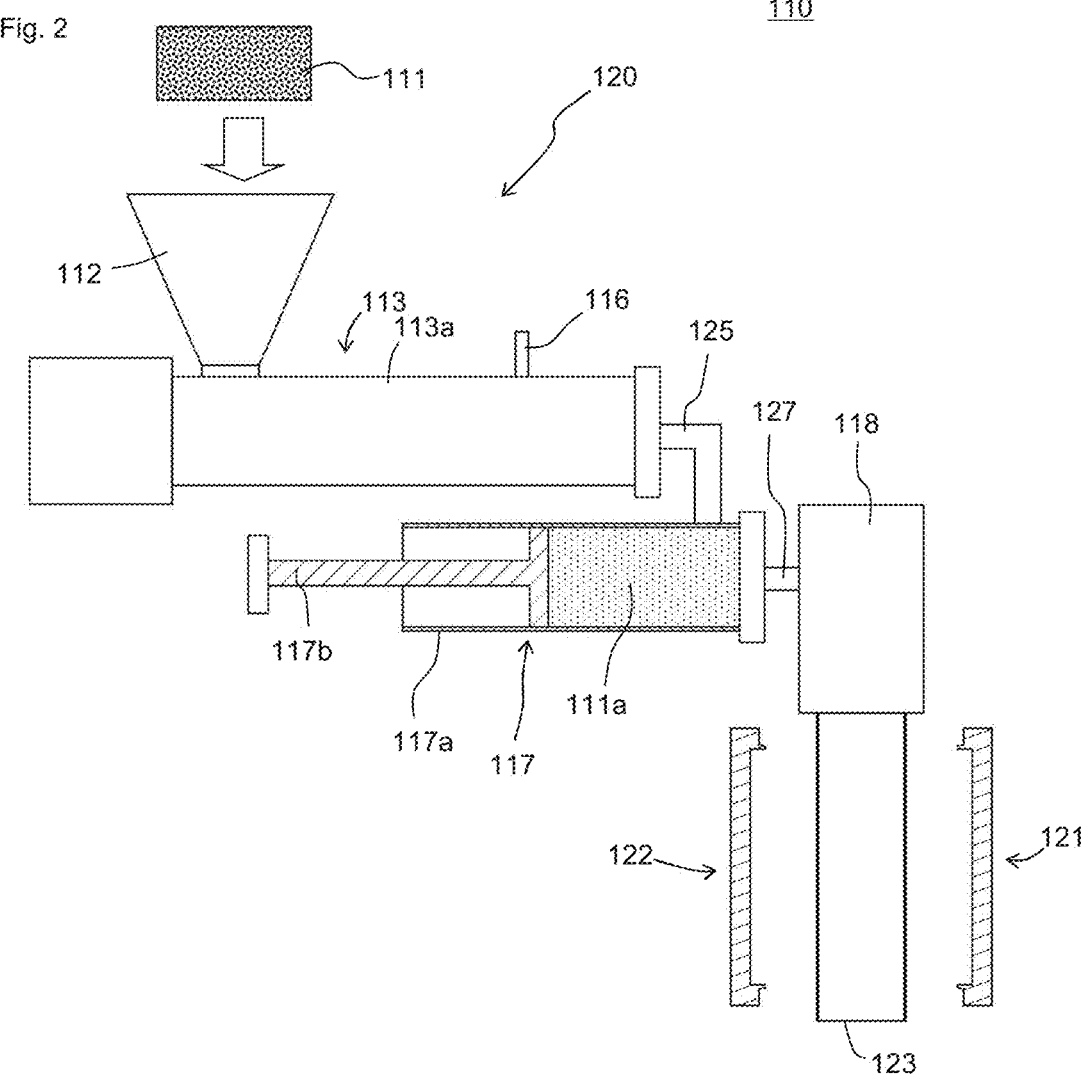
FIG. 2 shows the configuration of a molding machine 110 that can be used for manufacturing a foam blow molded body.
Figure 3:
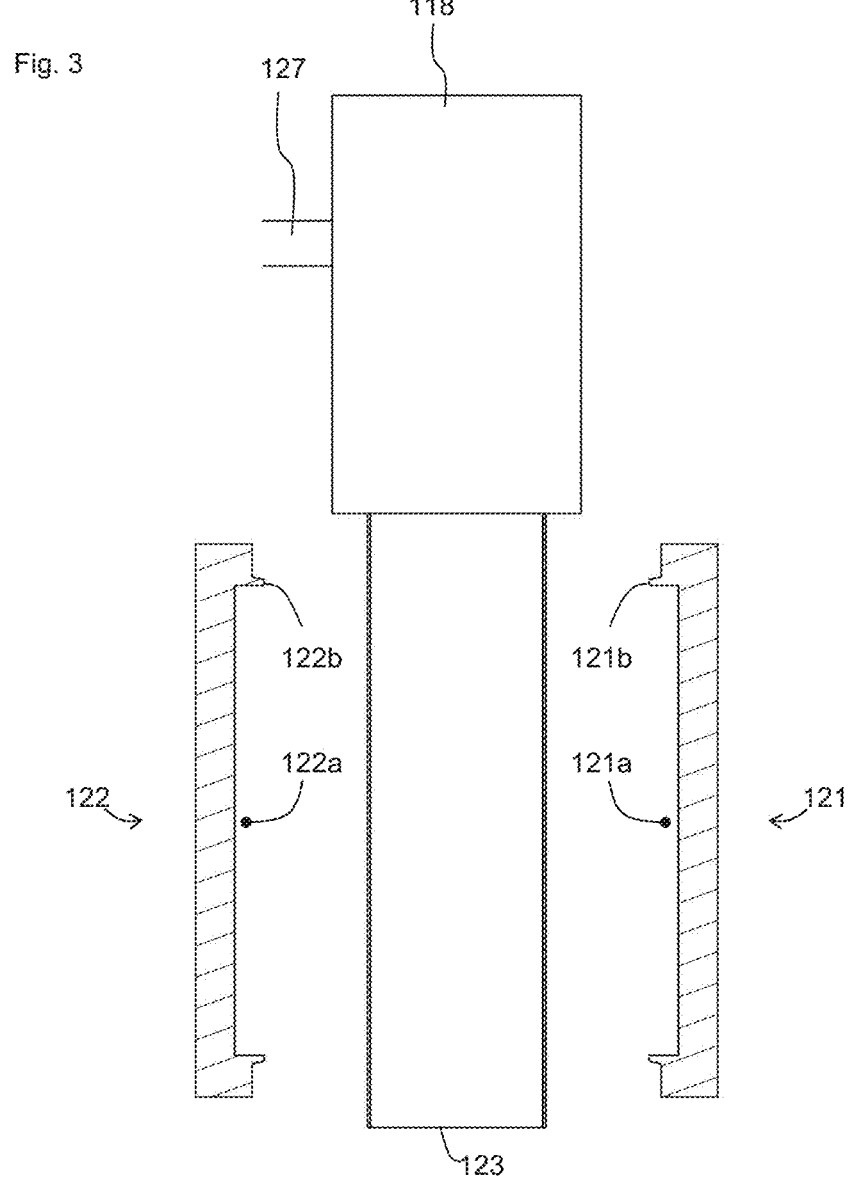
FIG. 3 is an enlarged view of the vicinity of a head 118 and molds 121,122 in FIG. 2.

With reference to FIG. 2 to FIG. 3, a molding machine 110 that can be used for manufacturing the foam blow molded body is described. The molding machine 110 comprises a resin supply device 120, a head 118, and first and second molds 121, 122. The resin supply device 120 comprises a hopper 112, an extruder 113, an injector 116, and an accumulator 117. The extruder 113 and the accumulator 117 are connected to each other via a connecting pipe 125. The accumulator 117 and the head 118 are connected to each other via a connecting pipe 127.

Hereinafter, each configuration is described in detail.

<Hopper 112, Extruder 113>

The hopper 112 is used for charging a raw resin 111 into a cylinder 113a of the extruder 113. The form of the raw resin 111 is not particularly limited and is usually a pellet form. The raw resin 111 is composed of the above-mentioned resin composition. In one example, the raw resin 111 contains pellets of the base resin and pellets of masterbatch containing the flame retardant in the base resin. The blending amount of the flame retardant can be adjusted by changing the blending ratio of the pellets of the base resin and the pellets of masterbatch. The raw resin 111 is charged into the cylinder 113a from the hopper 112 and then heated in the cylinder 113a to be melted into a molten resin. Further, it is conveyed toward the tip of the cylinder 113a by the rotation of a screw arranged in the cylinder 113a.

<Injector 116>

The cylinder 113a is provided with the injector 116 for injecting the foaming agent into the cylinder 113a. As the foaming agent, those described above can be used. The physical foaming agent is usually charged from the injector 116. The chemical foaming agent is usually charged from the hopper 112.

<Accumulator 117, Head 118>

A molten resin 111a, which is obtained by melt-kneading the raw resin and the foaming agent, is extruded from a resin extrusion port of the cylinder 113a and injected into the accumulator 117 through the connecting pipe 125. The accumulator 117 comprises a cylinder 117a and a piston 117b slidable inside the cylinder, and the molten resin 111a can be stored in the cylinder 117a. The piston 117b is moved after a predetermined amount of the molten resin 111a is stored in the cylinder 117a, so that the molten resin 111a is extruded from a die slit provided in the head 118 through the connecting pipe 127 and hung down to form a foamed parison 123 having a tubular shape.

<First and Second Molds 121, 122>

The foamed parison 123 is guided between the molds 121, 122. As shown in FIG. 3, the molds 121, 122 include cavities 121a, 122a, and pinch-off portions 121b, 122b are provided so as to surround the cavities 121a, 122a. The cavities 121a, 122a are configured to have the shape of the foam molded body 101 when the molds 121, 122 are closed.

2-1-2. Manufacturing Method of Foam Blow Molded Body

The manufacturing method of the foam blow molded body comprises a molding step.

The molding step comprises, for example, an extruding step, a mold closing step, and a blowing step.

In the extruding step, the foamed parison 123 is extruded between the molds 121, 122. In the mold closing step, a portion of the foamed parison 123 is accommodated in the cavities 121a, 122a between the molds 121, 122 by closing the molds 121, 122 after the extruding step. The portion of the foamed parison 123 accommodated in the cavities 121a, 122a is formed into a bag shape. In the blowing step, air is blown into the bag-shaped foamed parison 123. At this time, the foamed parison 123 is shaped along the surface shape of the cavities 121a, 122a to form the foam blow molded body. Then, the molds 121, 122 are opened to remove the foam blow molded body, and post-treatment, such as burr removal, is performed to obtain the desired molded product.

2-2. Foam Sheet Molded Body 2-2-1. Configuration of Molding Machine 110

Figure 4:
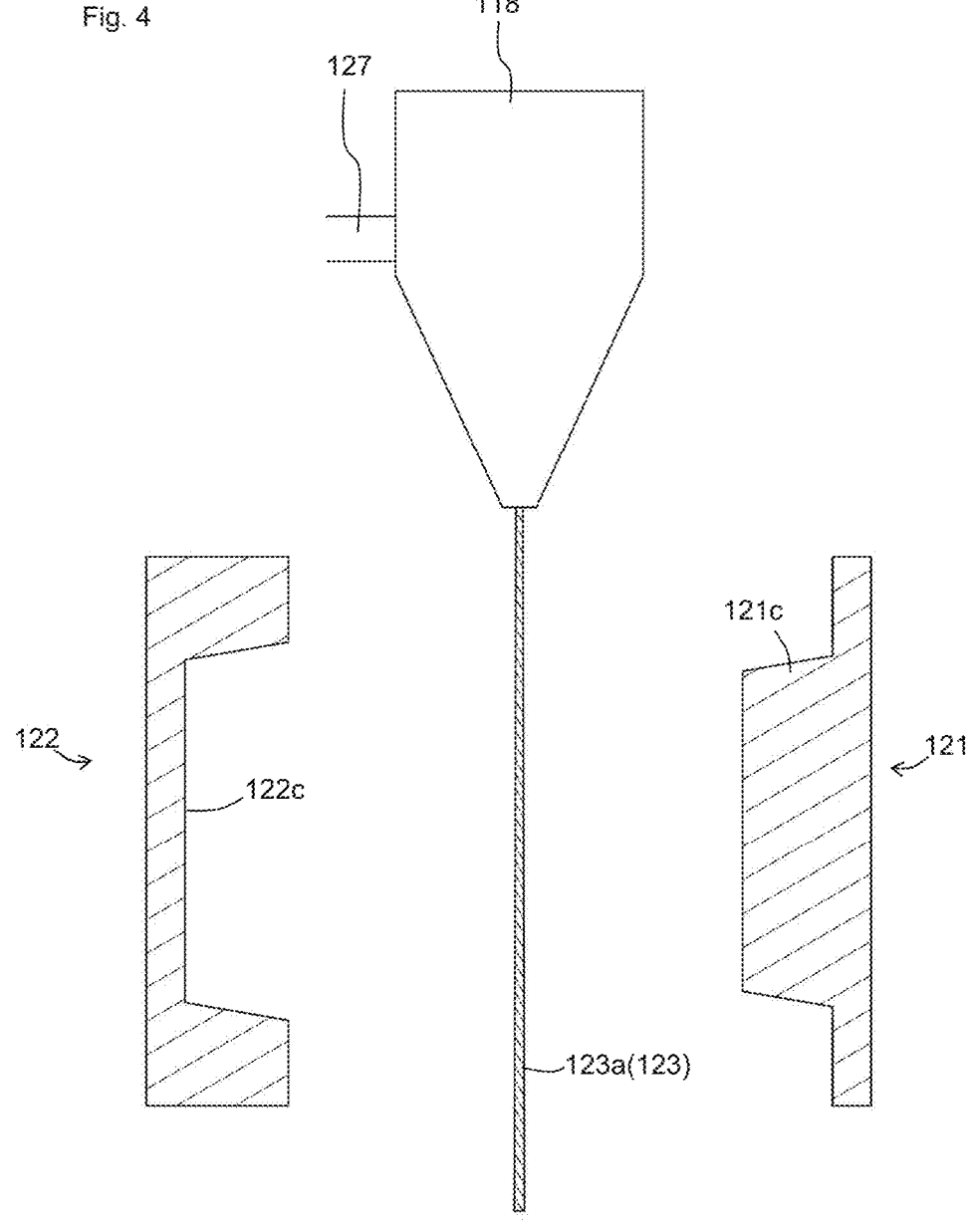
FIG. 4 is a diagram corresponding to FIG. 3, showing the head 118 and the molds 121,122 that can be used for manufacturing a foam sheet molded body.

With reference to FIG. 4, the molding machine 110 that can be used for manufacturing the foam sheet molded body is described. The configuration of the molding machine 110 is the same as described in "2-1-1. Configuration of Molding Machine 110" except that the configurations of the head 118 and the molds 121, 122 are different, and thus the description is not repeated.

In foam sheet molding, as shown in FIG. 4, the sheet-shaped foamed parison 123 (hereinafter, referred to as "a foamed resin sheet 123a") is extruded from the head 118. Therefore, a T die is usually used as the head 118.

Figure 5:
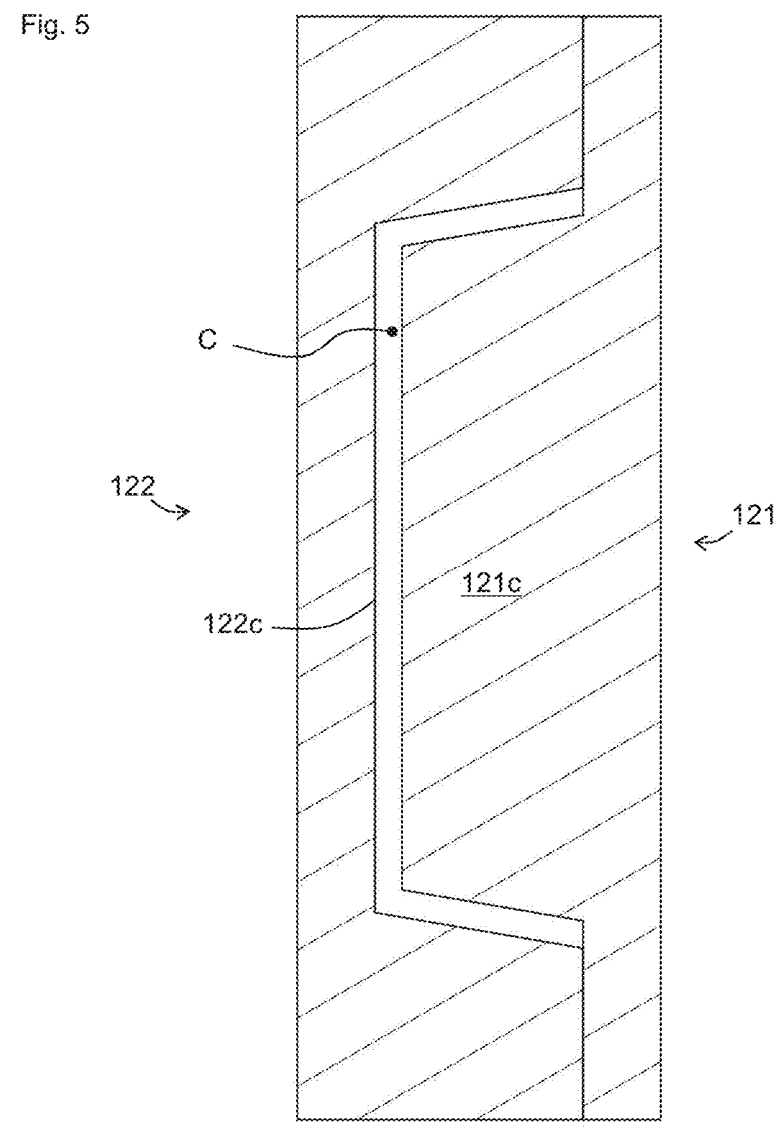
FIG. 5 shows a state in which the molds 121,122 in FIG. 4 are closed.

The mold 121 includes a convex portion 121c, and the mold 122 includes a concave portion 122c. As shown in FIG. 5, while the molds 121, 122 are closed, the convex portion 121c is accommodated in the concave portion 122c, and a cavity C is provided between the convex portion 121c and the concave portion 122c.

2-2-2. Manufacturing Method of Foam Sheet Molded Body

The manufacturing method of foam sheet molded body comprises a molding step.

The molding step comprises, for example, an extruding step, a mold closing step, and a blowing step.

In the extruding step, the foamed resin sheet 123a is extruded between the molds 121, 122. In the mold closing step, a portion of the foamed resin sheet 123a is accommodated in the cavity C between the convex portion 121c and the concave portion 122c by closing the molds 121, 122 after the extruding step.

Preferably, the thickness of the foamed resin sheet 123a is smaller than the thickness of the cavity C. In such a case, even when the foamed resin sheet 123a is accommodated in the cavity C, a gap exists in the cavity C. In this state, the suction under reduced pressure is performed by the molds 121, 122. Consequently, the foamed resin sheet 123a expands in the cavity C, and the foam sheet molded body in the shape of the cavity C is obtained. According to such a method, since the cell of the foamed resin sheet 123a is expanded by the suction under reduced pressure after closing the molds 121, 122, the foam molded body with the large expansion ratio and cell diameter can be obtained. Then, the molds 121, 122 are opened to remove the foam sheet molded body, and post-treatment, such as burr removal, is performed to obtain the desired molded product.

In this regard, the foam sheet molded body may be manufactured by molding the foamed resin sheet 123a according to another method. For example, it may be manufactured by molding using one mold (e.g., vacuum molding). Further, the peripheral edges of two foamed resin sheets 123a which are molded by vacuum molding using different molds, may be welded to each other to form a hollow foam molded body.

(Second Viewpoint)

Hereinafter, an embodiment of a manufacturing method of a molded body to which the present invention is applied is described with reference to the drawings, taking the blow molding of a duct as an example.

Figure 6:
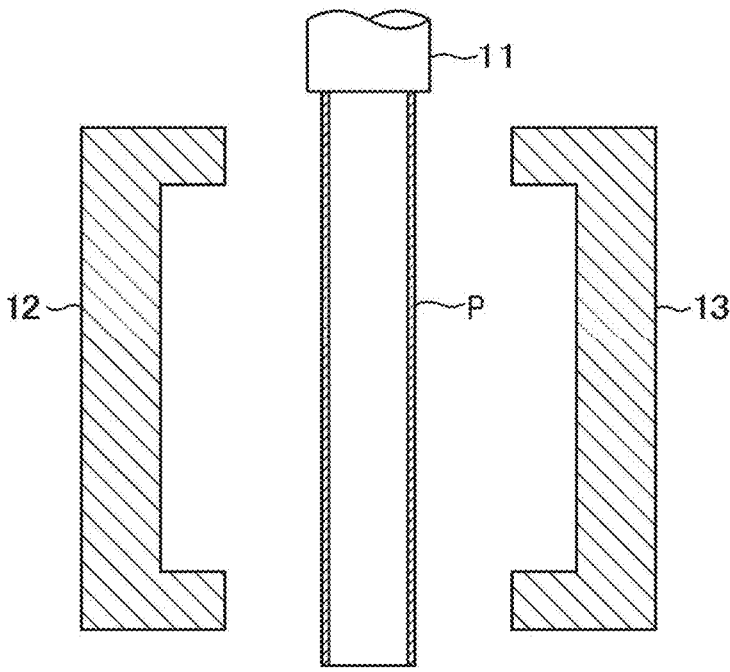
FIG. 6 is a schematic cross-sectional view schematically showing an aspect of blow-molding a molded body.

FIG. 6 is a diagram for explaining a blow molding method when blow-molding a duct as a molded body. In blow molding, first, a resin material used for molding is melt-kneaded in an extruder to prepare a molding resin. For example, when only a virgin resin is used in molding, a modifier is added to the virgin resin of various resin materials as necessary, and the material is melt-kneaded to produce the molding resin. When a recovered resin material is used, a virgin resin is added to the crushed recovered resin material at a predetermined ratio and kneaded to prepare the molding resin.

The resin material used for molding is not particularly limited, and for example, a thermoplastic resin, such as polyolefin resin, e.g., polypropylene, is used. When the molded body (a duct 1) is a foam molded body, a foaming agent is added to the molding resin.

The molding resin prepared in this way is melt-kneaded in the extruder and then stored in an accumulator in a die. Subsequently, after a predetermined amount of resin is stored, a ring-shaped piston is pushed down in a direction orthogonal to the horizontal direction (vertical direction). Then, a cylindrical parison P is extruded from a die slit of an annular die 11 shown in FIG. 6 at a predetermined extrusion rate between split molds 12, 13. Then, the split molds 12, 13 are clamped to sandwich the parison P, and air is blown into the parison P within a predetermined pressure range to form the duct 1.

Figure 7:
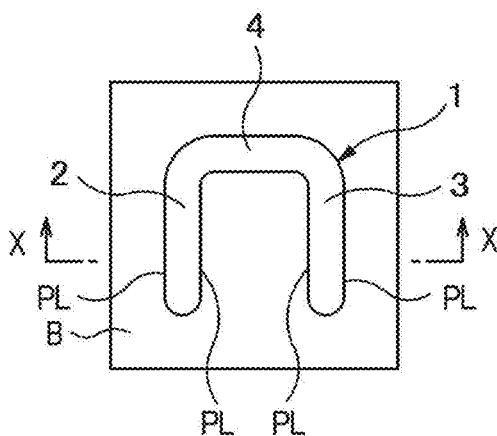
FIG. 7 is a schematic plan view showing an example of a molded body before removing a burr.

FIG. 7 shows an example of the shape of the molded duct 1 and shows the duct 1 removed from the split molds 12, 13.

The duct of this example includes two duct portions 2, 3 arranged in parallel and a duct portion 4 formed to connect these duct portions 2, 3. The wall thickness of the duct 1 as the molded body may vary from part to part depending on the blow ratio and the like and is, for example, 3 mm or more (3 mm to 8 mm) on average, and in particular, 3 mm or more (3 mm to 8 mm) in the vicinity of an opening K described later. Further, an extra parison P remains as a burr B around the duct 1 as the molded body.

Figure 8:
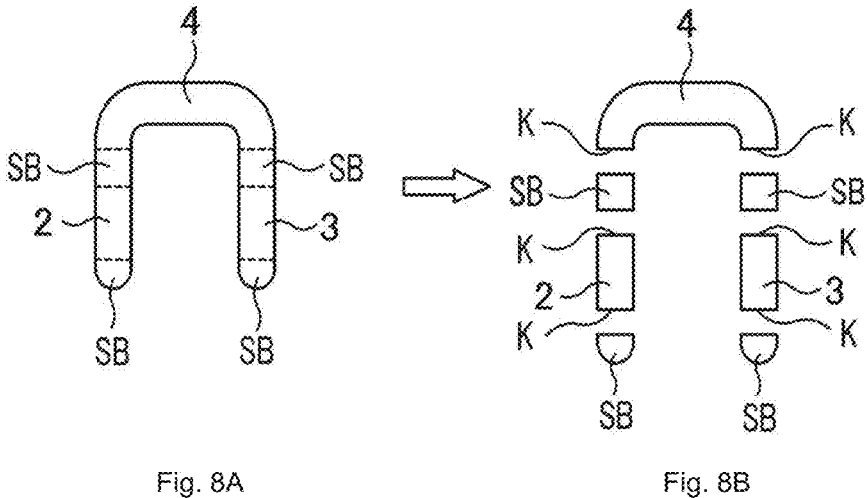
FIG. 8A shows a bag-shaped waste portion of the molded body and an opening of the molded body in a state before cutting the bag-shaped waste portion.
FIG. 8B shows a bag-shaped waste portion of the molded body and an opening of the molded body in a a state after cutting bag-shaped waste portion.

FIG. 8A and FIG. 8B show a process of dividing the duct 1 as the molded body into the duct portions 2, 3, 4. As shown in FIG. 8A, a so-called bag-shaped waste portion SB is formed between the duct portions 2, 3, 4 and at the end of the duct portions 2, 3. The duct 1 is divided into the duct portions 2, 3, 4, as shown in FIG. 8B, by cutting the duct at a position of the broken lines in FIG. 8A, and the bag-shaped waste portions SB are discarded. Each of the duct portions 2, 3, 4 after cutting has the opening K at both ends.

Figure 9:
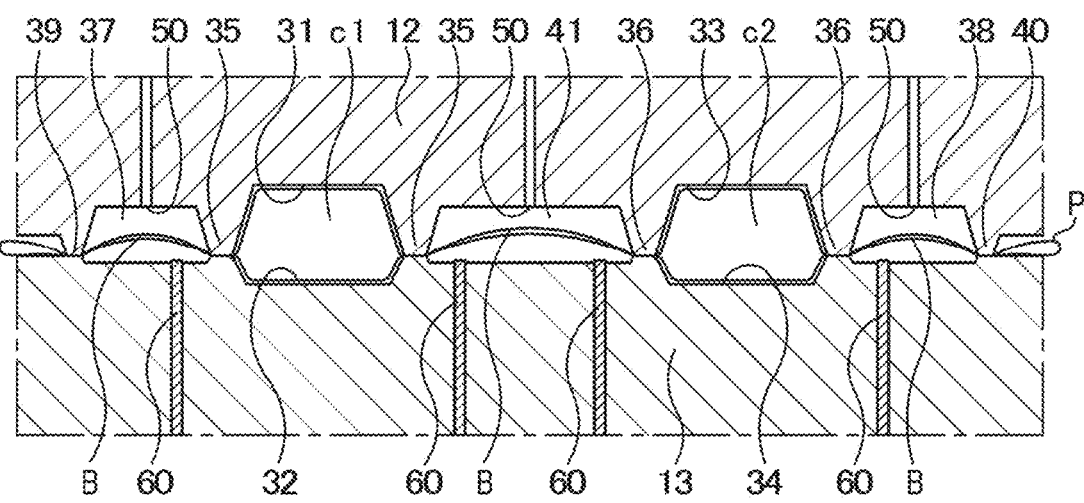
FIG. 9 is a diagram for explaining the operation from molding to burr removal and is a schematic cross-sectional view showing a molding step of the molded body.
Figure 10:
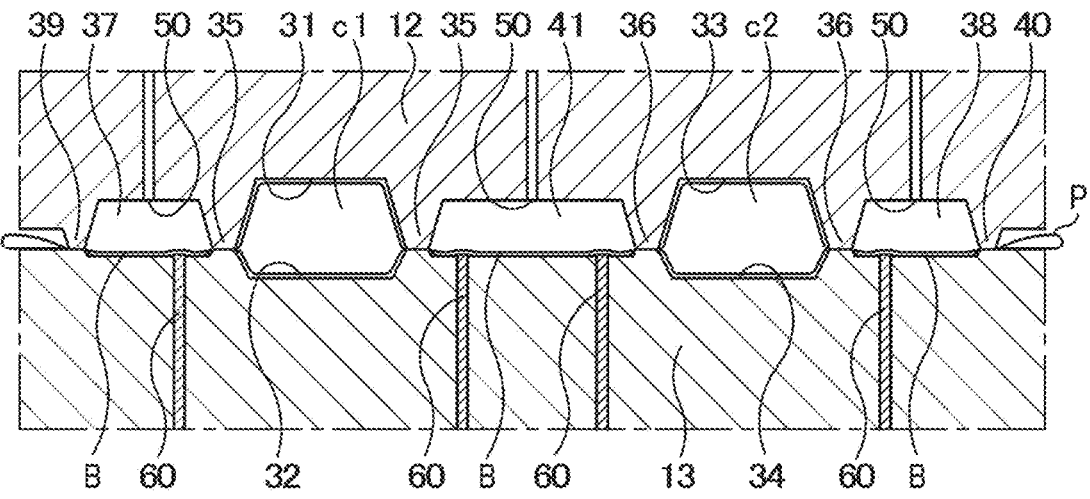
FIG. 10 is a schematic cross-sectional view showing a burr cooling step by air blow.
Figure 11:
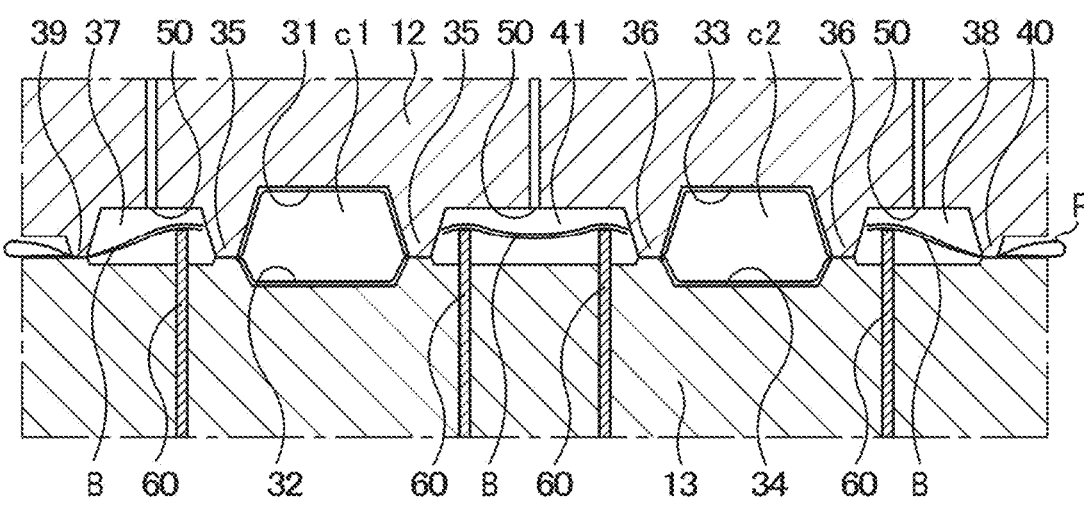
FIG. 11 is a schematic cross-sectional view showing a protruding step using a protruding member.

In the blow molding of the present embodiment, the process from molding the duct 1 to cutting the burr B is performed in the closed split molds 12, 13. Hereinafter, the configuration of the split molds 12, 13 and the molding method using them are described with reference to FIG. 9 to FIG. 11. In this regard, FIG. 9 to FIG. 11 show a cross section of the duct 1 shown in FIG. 7 at a position corresponding to a x-x line.

Concave portion corresponding to the shape of the duct 1 are formed on the split molds 12, 13 used for molding the duct 1. As shown in FIG. 9, concave portions 31, 32 corresponding to the duct portion 2 and concave portions 33, 34 corresponding to the duct portion 3 are formed on the split molds 12, 13. Here, the concave portions 31, 32 form a cavity (space) c1 corresponding to the duct portion 2 between the split molds 12, 13 in contact with each other, and the concave portions 33, 34 form a cavity (space) c2 corresponding to the duct portion 3 between the split molds 12, 13.

The material of the split molds 12, 13 is not particularly limited. For example, aluminum or steel can be used. It is preferable to use aluminum because it has high thermal conductivity and can efficiently cool a burr to be punched.

The parison P supplied between the split molds 12, 13 is shaped along the concave portions 31, 32 or the concave portions 33, 34 of the split molds 12, 13 by blowing air inside after clamping the molds and is shaped along the cavities c1, c2 formed by the concave portions 31, 32 or the concave portions 33, 34 of the split molds 12, 13.

Further, each of the split molds 12, 13 includes a pinch portion configured to abut against each other in an outer peripheral portion of the cavities c1, c2 (that is, the duct 1 as the molded body). A pinch portion 35 is provided around the cavity corresponding to the duct portion 2, and a pinch portion 36 is provided around the cavity corresponding to the duct portion 3. The parison P is pressed by these pinch portions 35, 36, and this pressed portion becomes a parting line (PL) of the molded body.

Here, the parison P remaining on the outside of the pinch portions 35, 36 becomes the burr B. In the present embodiment, the split molds 12, 13 are provided with the mechanism for separating the burr B from the duct 1 as the molded body.

On the outside of the pinch portions 35, 36 of the split molds 12, 13, the mold surface of the split mold 12 is recessed, and spaces 37, 38 for accommodating the burr B are formed. In FIG. 9, the space 37 is formed on the outside of the pinch portion 35 on the left side of the cavity c1 corresponding to the duct portion 2, and the space 38 is formed on the outside of the pinch portion 36 on the right side of the cavity c2 corresponding to the duct portion 3. The burr B in the vicinity of the pinch portions 35, 36 is accommodated in the space 37 and the space 38.

Further, the end portions of the spaces 37, 38 opposite to the pinch portions 35, 36 are closed by pinch portions 39, 40 formed at a predetermined distance from the pinch portions 35, 36. That is, when the pinch portions 35, 36 are regarded as a first pinch portion and the pinch portions 39, 40 are regarded as a second pinch portion, the spaces 37, 38 are formed as a space between these pinch portions. The spaces 37, 38 are formed as a closed space in this way, so that the air (cold air) blown from an air blowing mechanism described later does not escape from the spaces 37, 38. In this regard, in order to release air from these spaces 37, 38 in air blowing, a pin for air escape may be inserted into the spaces 37, 38, or another air escape mechanism may be provided.

Each of the spaces 37, 38 is provided with the air blowing mechanism and a protruding member, which are used to separate the burr B from the molded body (the duct 1). Specifically, in the present embodiment, blowing holes 50 for blowing air corresponding to the spaces 37, 38 are formed in the split mold 12 on the upper side of the drawing. Air (cold air) is blown out from these air blowing holes 50, and the cold air is blown to the burr B.

On the other hand, in the split mold 13 on the lower side of the drawing, protruding rods 60 as a protruding member are installed at a position close to the pinch portions 35, 36 and arranged along the pinch portions 35, 36. The protruding rod 60 is a rod-shaped member having a diameter of about 20 mm to 30 mm, and the tip of the protruding rod 60 is installed so as to slightly protrude from the mold surface of the mold 13. By protruding these protruding rods 60 from the mold surface, the burr B is pressed against the mold surface of the split mold 12.

The form of the protruding rod 60 is not particularly limited, and for example, a rod-shaped body having a circular cross section may be used, or a rod-shaped body having an annular protrusion that has a concave portion in the center of the tip surface may be used. Alternatively, a rod-shaped body having a small convex portion with a small diameter at the tip may be used. In any case, the tip of the protruding rod 60 is preferably configured so that its shape is transferred when the burr B in a molten state is pressed against it by air blowing and it can lock the burr B to prevent the burr B from being displaced.

As described above, the protruding rods 60 are arranged along the pinch portions 35, 36, and the narrower the interval between the protruding rods, the easier it is to cut a burr. Therefore, the arrangement pitch (arrangement interval) of the protruding rods 60 is preferably 170 mm or less.

Further, as the operating means of the protruding rod 60, for example, a hydraulic method can be adopted, and each of the protruding rods 60 may be operated independently or may be operated simultaneously using a mold back plate or the like. Depending on the shape of the molded body, burr removal can be smoothly performed by making the timing at which the protruding rod 60 is brought into contact variable, and in such a case, the timing can be appropriately adjusted by adjusting the stroke of each of the protruding rods 60.

The above description is applied to the burr B on the outside of the duct portions 2, 3, and the same configuration can be applied to the burr B between the duct portions 2, 3. However, it is not necessary to form the second pinch portion for the burr between the duct portions 2, 3. A space 41 is formed between the pinch portion 35 of the duct portion 2 and the pinch portion 36 of the duct portion 3, and the blowing hole 50 for air blowing and the protruding rod 60 may be formed in the space. In this regard, while the protruding rods 60 are arranged at one point (in one row) on a side of the molded body (on a side of the duct portion 2 or a side of the duct portion 3) in the spaces 37, 38, the protruding rods 60 are arranged at two points, on the side of the duct portion 2 and the side of the duct portion 3 in the space 41.

Next, steps in blow molding using these split molds 12, 13 are described. In order blow-mold the duct 1 as the molded body, the parison P supplied from the die slit of the annular die 11 is sandwiched by the split molds 12, 13, and air is blown into the parison P to shape the parison P into the shape of the cavities of the split molds 12, 13, as described above. This state is shown in FIG. 9. The parison P is sandwiched between the split molds 12, 13 and shaped, and the duct portion 2 and the duct portion 3 are molded in the cavities c1, c2 of the split molds 12, 13.

After the molding of the duct portions 2, 3 is completed, air is supplied from the blowing holes 50 provided on the split mold 12 on the upper side, as shown in FIG. 10, and air is blown to the surface of the burr B. The air to be supplied is preferably cold air. Further, it is preferable to blow the air so that the air is blown to the burr B in the vicinity of the pinch portions 35, 36. The burr B is cooled by this air blow, and the rigidity is increased in a short time.

In this regard, the air blow has the role of pressing the burr B against the protruding rod 60 in addition to the function of cooling the burr B. By pressing the burr B against the protruding rod 60, the burr B can be pressed against the mold 12 on the opposite side with a large stroke of the protrusion of the protruding rod 60, so that the burr B can be securely separated from the molded body.

After cooling the burr B by air blow, the burr B with the increased rigidity is pressed against the split mold 12 on the opposite side by the protruding rod 60, and the burr B is separated (cut) by tearing it from the molded body, as shown in FIG. 11. The burr B on the outside of the duct portions 2, 3 is separated from the molded body in the spaces 37, 38 by the protrusion of the protruding rod 60 provided in the vicinity of the pinch portions 35, 36. The burr B between the duct portions 2, 3 is separated from the molded body in the space 41 by the protrusion of two protruding rods 60 provided in the vicinity of the pinch portions 35, 36, respectively.

The burr B is separated from the molded body in the split molds 12, 13 by the above-described steps. That is, in the blow molding of the present embodiment, the molding and burr treatment of the molded body (the duct 1) are completed in the mold, and thus the molding and burr treatment can be performed more efficiently.

When the burr B is separated from the molded body (the duct 1) by the protrusion of the protruding rod 60 from a side of the split mold 13, it is preferable that the concave portion forming the spaces 37, 38 for accommodating the burr B on the split mold 13 from which the protruding rod 60 protrudes is as shallow as possible. By forming the shallow concave portion, the distance between the tip of the protruding rod 60 and the parting line of the molded body for cutting the burr B is reduced, and the burr B can be cut more easily. When the concave portion becomes deep, the force of the protruding rod 60 is not effectively transmitted to the burr B.

However, when the depth of the concave portion is small, the volumes of the spaces 37, 38 (burr escape space) for accommodating the burr B become smaller. Consequently, the molten resin cannot be completely accommodated in the burr escape space, and a thick-walled portion (so-called excess thickness portion) tends to be formed on the molded body. The formation of the thick-walled portion may lead to lower dimensional accuracy and may cause a big problem in the opening of the molded body.

Figure 12:
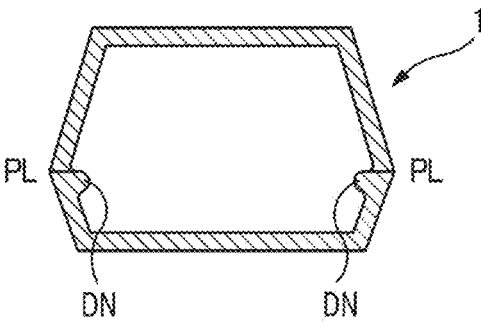
FIG. 12 is a diagram for explaining a thick-walled portion (excess thickness portion) formed on the molded body (duct).

For example, when the wall thickness t of the duct 1 is 3 mm or more (for example, 3 mm to 8 mm) in the vicinity of the opening K, and the depth of the concave portion on the split mold 13 from which the protruding rod 60 protrudes is smaller than the wall thickness of the duct 1, a thick-walled portion (so-called excess thickness portion) is formed on an inner surface of the duct 1. FIG. 12 shows a cross section of the duct 1 molded under such a condition, and a resin bulge (an excess thickness portion DN) is formed in the vicinity of the parting line PL of the duct 1. In particular, if the depth of the concave portion on the split mold (the split mold 13 on the lower side) from which the protruding rod 60 protrudes is smaller than the wall thickness of the duct 1, the excess thickness portion DN tends to be generated below the parting line PL. The formation of the excess thickness portion DN becomes a factor that significantly reduces the dimensional accuracy of the inner diameter of the duct 1 and becomes an obstacle, for example, when fitting the duct to another duct or to a connecting member.

Therefore, in the present embodiment, on the split mold 13 from which the protruding rod 60 protrudes, the depth of the concave portion at the position of the opening of the molded body is larger than the depth of the concave portions of the other portion, and the protruding rod 60 is provided on the other portion, so that the burr B can be cut more easily, and the formation of the thick-walled portion is suppressed.

Figure 13:
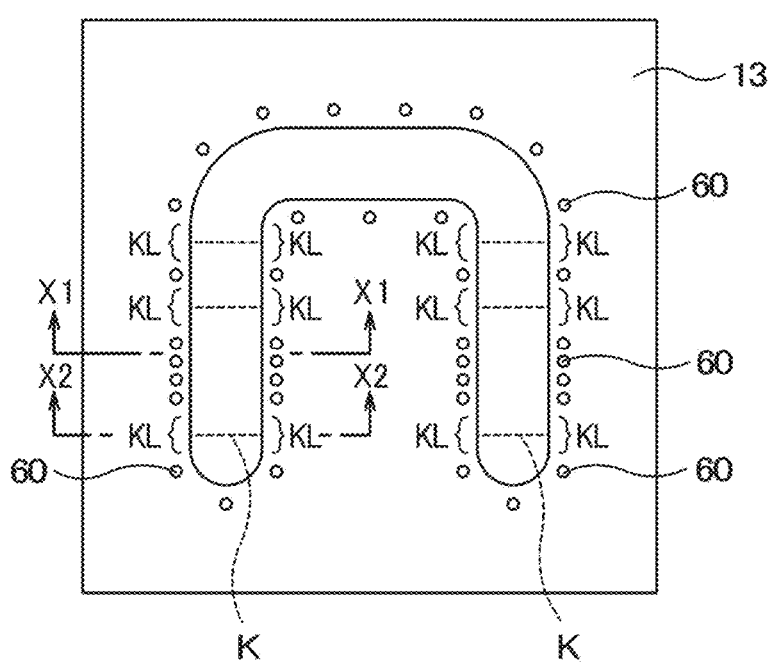
FIG. 13 is a schematic plan view showing a position where the opening of the molded body is formed and the arrangement of the protruding members on a split mold where the protruding members are provided.

FIG. 13 is a schematic plan view of the split mold 13 from which the protruding rod 60 protrudes. The protruding rods 60 are arranged along the periphery of the cavity for forming the duct 1. Further, the broken lines in FIG. 13 show a cutting position when the duct 1 is divided into the duct portions 2, 3, 4, and this cutting position corresponds to the openings K of the duct portions 2, 3, 4.

Figure 14:
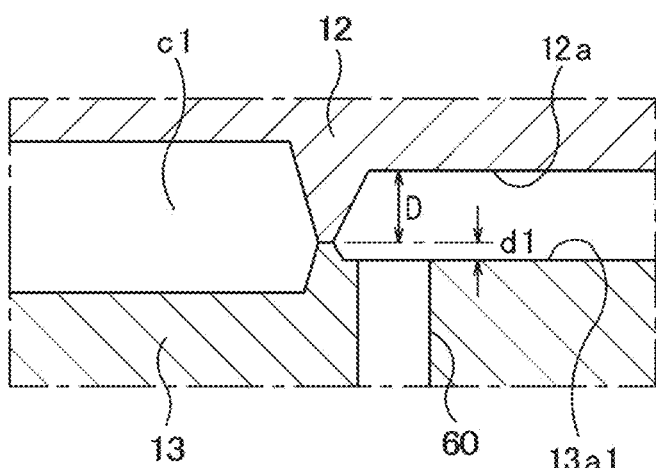
FIG. 14 schematically shows a concave portion of the split mold at a position where the protruding portion is installed.

Here, the concave portion is formed on each of the split molds 12, 13 to form the spaces 37, 38 for accommodating the burr B. In a region where the protruding rods 60 are arranged (a deburring region) in FIG. 13, the depth of a concave portion 12a of the split mold 12 on the upper side is D, and the depth of a concave portion 13a1 of the split mold 13 on the lower side (on which the protruding rods 60 are installed) is d1, as shown in FIG. 14 (a cross-sectional view taken along a X1-X1 line in FIG. 13). The depth D of the concave portion 12a of the split mold 12 is about 10 mm to 50 mm (for example, 30 mm), and the depth d1 of the concave portion 13a1 of the split mold 13 on the lower side is about 0.5 mm to 3 mm (for example, 1 mm).

Figure 15:
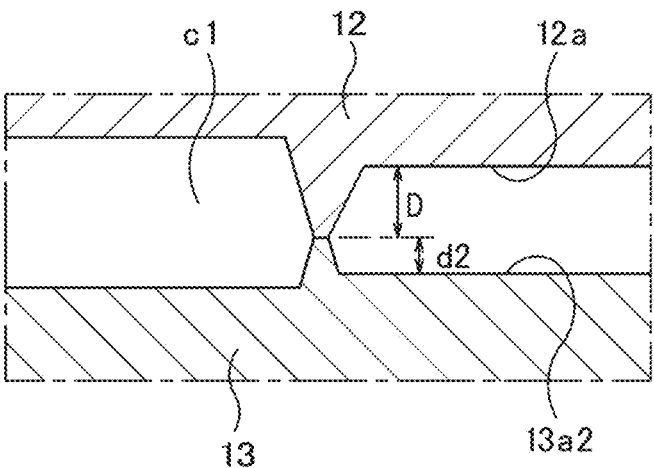
FIG. 15 schematically shows the concave portion of the split mold at a position corresponding to the opening of the molded body.

On the other hand, in an area corresponding to the openings K of the duct portions 2, 3, 4 (a region KL: region of about several centimeters on both sides of the cutting line), as shown in FIG. 15 (a cross-sectional view taken along a X2-X2 line in FIG. 13), the depth of the concave portion 12a of the split mold 12 on the upper side is D, and the depth of the concave portion 13a1 of the split mold 13 on the lower side is d2, wherein d2>d1 is satisfied. Specifically, the depth D of the concave portion 12a of the split mold 12 is about 10 mm to 50 mm (for example, 30 mm), which is the same as in the case of FIG. 14, and the depth d2 of a concave portion 13a2 of the split mold 13 on the lower side is equal to or more than the wall thickness t of the duct 1. When the wall thickness t of the duct 1 is 3 mm, the depth d2 of the concave portion 13a2 is 3 mm or more (for example, 4 mm).

Figure 16:
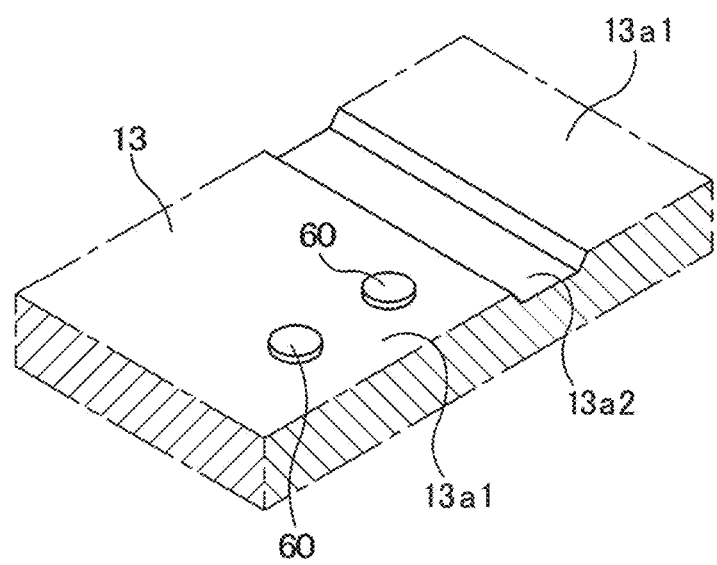
FIG. 16 is a schematic perspective view showing the concave portion of the split mold provided with the protruding members.

FIG. 16 shows the aspect in which the depth of the concave portion 13a1 and the concave portion 13a2 of the split mold 13 is changed in this way. By increasing the depth of the concave portion 13a2, the spaces 37, 38 for accommodating the burr B are expanded in this portion (the portion corresponding to the openings K of the duct portions 2, 3, 4), and the formation of the thick-walled portion (the formation of the excess thickness portion) is suppressed. In the region where the protruding rods 60 are installed, the depth d1 of the concave portion 13a1 remains shallow, and thus the burr B can be easily cut.

Although the embodiments to which the present invention has been applied have been described above, the present invention is not limited to the above-mentioned embodiments, and various modifications can be made without departing from the gist of the present invention.

EXAMPLES (Examples of First Viewpoint)

1. Preparation of Samples

Samples of the foam blow molded body, the foam sheet molded body, and the non-foam blow molded body were prepared according to the method shown below and conditions shown in Table 1 to Table 2.

TABLE 1

| Raw material | Type | HMS-PP | PP | | Modifier | Black MB | Chemical foaming agent |
|---|---|---|---|---|---|---|---|
| composition | Grade | WB140 | BC4BSW | AH561 | NF325N | PEX999017 | CF40EJ |
| Composition 1 | | 80 | 10 | — | 10 | 1 | 1 |
| Composition 2 | | 60 | — | 40 | — | 1 | 1 |
| Composition 3 | | 80 | 10 | — | 10 | 1 | — |

The values of the composition in Table 1 are mass ratios, and the detail of the components in Table 1 is as follows.

WB140: metallocene high melt tension polypropylene, manufactured by Borealis AG, product name "Daploy WB140"

BC4BSW: polypropylene, manufactured by Japan Polypropylene Corporation, product name "Novatec PP BC4BSW"

AH561: polypropylene, manufactured by Sumitomo Chemical Company, Limited, product name "Sumitomo Noblen AH561"

NF325N: metallocene polyethylene by vapor phase method, manufactured by Japan Polyethylene Corporation, product name "Harmorex NF325N"

PEX999017: carbon black masterbatch, manufactured by Tokyo Printing Ink Mfg. Co., Ltd.

CF40EJ: chemical foaming agent, manufactured by Tokyo Printing Ink Mfg. Co., Ltd.

TABLE 2

| No. | Type | Raw material composition | Physical foaming agent | Basis weight [g/m²] | Expansion ratio | Wall thickness [mm] | Average cell diameter in thickness direction Flame retardant 0% | Average cell diameter in thickness direction Flame retardant 1% | Combustion Speed [mm/min] Flame retardant 0% | Combustion Speed [mm/min] Flame retardant 1% | Delay effect |
|---|---|---|---|---|---|---|---|---|---|---|---|
| 1 | Foam | 1 | Nitrogen | 340 | 4.0 | 1.5 | 146 | 150 | 80.5 | 65.2 | 19.0% |
| 2 | blow | | gas | 450 | | 2.0 | 148 | 155 | 72.5 | 57.8 | 20.3% |
| 3 | molded | | | 680 | | 3.0 | 140 | 148 | 50.2 | 42 | 16.3% |
| 4 | body | | | 800 | | 3.5 | 132 | 163 | 43.1 | 36 | 16.5% |
| 5 | | 1 | Carbon | 340 | 4.0 | 1.5 | 220 | 230 | 78.8 | 58.8 | 25.4% |
| 6 | | | dioxide | 450 | | 2.0 | 234 | 245 | 71.6 | 49.5 | 30.9% |
| 7 | | | gas | 680 | | 3.0 | 237 | 255 | 49.8 | 41.4 | 16.9% |
| 8 | | | | 800 | | 3.5 | 249 | 250 | 46.5 | 36.5 | 21.5% |
| 9 | Foam | 1 | Nitrogen | 600 | 4.5 | 3.0 | 443 | 432 | 35.8 | Self extinction | — |
| 10 | sheet molded body | | gas | 800 | 3.4 | | 453 | 444 | 30.5 | Self extinction | — |
| 11 | | 2 | | 600 | 4.5 | | 429 | 431 | 41.5 | Self extinction | — |
| 12 | | | | 800 | 3.4 | | 444 | 456 | 28.1 | Self extinction | — |

TABLE 2-continued

| No. | Type | Raw material composition | Physical foaming agent | Basis weight [g/m²] | Expansion ratio | Wall thickness [mm] | Average cell diameter in thickness direction | | Combustion Speed [mm/min] | | Delay effect |
|---|---|---|---|---|---|---|---|---|---|---|---|
| | | | | | | | Flame retardant 0% | Flame retardant 1% | Flame retardant 0% | Flame retardant 1% | |
| 13 | Non-foam molded body | 3 | n/a | 600 | 1.0 | 0.7 | — | — | 58.7 | 49.9 | 15.0% |
| 14 | blow | | | 800 | | 0.9 | — | — | 52.3 | 45.4 | 13.2% |

1-1. Foam Blow Molded Body (No. 1 to 8)

A foam blow molded body was prepared by the following method, using the molding machine 110 shown in FIG. 2 to FIG. 3.

As the raw resin, the raw material compositions shown in Table 1 to Table 2 to which the flame retardant (manufactured by Tokyo Printing Ink Mfg. Co., Ltd., hindered amine-based flame retardant, PEX-FRJ-91) was added in the blending amount shown in Table 2 was used.

The temperature of each component was controlled so that the temperature of the foamed parison 123 was 190 to 200° C. The physical foaming agent was injected via the injector 116. The injection amount of the foaming agent and the gap of the die slit of the head 118 were set so that the expansion ratio and the wall thickness of the molded body after cooling became the values shown in Table 2.

The foamed parison 123 was formed by extruding the molten resin 111*a* obtained under the above-mentioned conditions at the rate to achieve the basis weight shown in Table 2, and the foamed parison 123 was blow-molded using the molds 121, 122 to obtain the foam blow molded bodies of No. 1 to 8.

1-2. Foam Sheet Molded Body (No. 9 to 12)

Using the molding machine 110 having the same configuration as that of FIG. 2 except that the machine has the head (T die) 118 and the molds 121, 122 in the shape shown in FIG. 5, the foamed resin sheet was prepared by extruding a molten raw resin from the head 118 under the same conditions as in "1-1. Foam Blow Molded Body". By molding this foamed resin sheet, the foam sheet molded bodies of No. 9 to 12 were obtained.

1-3. Non-Foam Blow Molded Body (No. 13 to 14)

The non-foam blow molded bodies of No. 13 to 14 were obtained under the same conditions as "1-1. Foam Blow Molded Body" except that a foaming agent was not used.

2. Measurement of Average Cell Diameter in Thickness Direction

The average cell diameter in the thickness direction was measured for each sample. The results are shown in Table 2.

As shown in Table 2, the average cell diameter in the thickness direction was in the approximately same level in the sample with the flame retardant at 0% and the sample with the flame retardant at 1%.

3. Evaluation of Combustion Speed

For the samples of No. 1 to 14, the combustion speed was measured according to the flammability test of FMVSS No. 302. The results are shown in Table 2.

Further, Table 2 also shows the delay effect calculated on the basis of the following equation.

$$\text{Delay effect (\%)} = 100 \times \{1 - (\text{combustion speed at 1\% flame retardant})/(\text{Combustion speed at 0\% flame retardant})\}$$

Table 2 shows the following:

The delay effect of the foam blow molded bodies or the foam sheet molded bodies of No. 1 to 12 was larger than that of the non-foam blow molded bodies of No. 13 to 14. This result indicates that the effect of improving flame retardancy by adding the flame retardant in the foam molded body is larger than that in the non-foam molded body.

In the comparison between No. 1 to 4 and No. 5 to 8, when the physical foaming agent was carbon dioxide gas, the average cell diameter in the thickness direction was larger and the delay effect was larger than when the physical foaming agent was nitrogen gas. This result indicates that the effect of the flame retardant can be remarkably exhibited by using carbon dioxide gas as the physical foaming agent or by increasing the average cell diameter in the thickness direction.

The results of No. 9 to 12 show that, in the foam sheet molded body, the combustion speed before adding the flame retardant is small and the flame retardancy is significantly improved by adding the flame retardant.

REFERENCE SIGNS LIST

1: duct, 2, 3: duct portion, 4: connecting duct portion, 11: annular die, 12,13: split mold, 12*a*, 13*a*1, 13*a*2: concave portion, 31, 32, 33, 34: concave portion, 35, 36: pinch portion (first pinch portion), 37, 38: space, 39, 40: pinch portion (second pinch portion), 41: space, 50: air blowing hole, 60: protruding rod, DN: excess thickness portion, 101: foam the molded body, 110: molding machine, 111: raw resin, 111*a*: molten resin, 112: hopper, 113: extruder, 113*a*: cylinder, 116: injector, 117: accumulator, 117*a*: cylinder, 117*b*: piston, 118: head, 120: resin supply device, 121: first mold, 121*a*: cavity, 121*b*: pinch-off portion, 121*c*: convex portion, 122: second mold, 122*a*: cavity, 122*b*: pinch-off portion, 122*c*: concave portion, 123: foamed parison, 123*a*: foamed resin sheet, 125: connecting pipe, 127: connecting pipe.

The invention claimed is:

1. A foam blow molded body formed of a foam-molded resin composition containing a base resin, a flame retardant, and carbon black, wherein the foam blow molded body is hollow, the foam-molded resin composition is foamed by using a physical foaming agent and a chemical foaming agent, the physical foaming agent is carbon dioxide gas, an expansion ratio of the foam blow molded body is 4.0 times, the base resin contains 90 wt. % polypropylene and 10 wt. % polyethylene, a blending amount of the flame retardant in the resin composition is 1.0% by mass, the flame retardant is a hindered amine-based flame retardant, and a wall thickness of the foam blow molded body is 2.0 mm.

2. The foam blow molded body of claim 1, wherein an average cell diameter of the foam blow molded body in a thickness direction is 100 to 1000 μm.

\*     \*     \*     \*     \*